US009030353B2

(12) United States Patent
Kubota

(10) Patent No.: US 9,030,353 B2
(45) Date of Patent: May 12, 2015

(54) INFORMATION DISPLAY DEVICE, INFORMATION DISPLAY METHOD, AND RADAR APPARATUS

(75) Inventor: Yugo Kubota, Nishinomiya (JP)

(73) Assignee: Furuno Electric Company Limited, Hyogo (JP)

(*) Notice: Subject to any disclaimer, the term of this patent is extended or adjusted under 35 U.S.C. 154(b) by 318 days.

(21) Appl. No.: 13/458,888

(22) Filed: Apr. 27, 2012

(65) Prior Publication Data

US 2012/0274504 A1 Nov. 1, 2012

(30) Foreign Application Priority Data

Apr. 28, 2011 (JP) ................. 2011-101218

(51) Int. Cl.
G01S 7/04 (2006.01)
G01S 13/02 (2006.01)
G01S 7/12 (2006.01)
G01S 7/22 (2006.01)
G01S 13/93 (2006.01)
G08G 3/02 (2006.01)
(Continued)

(52) U.S. Cl.
CPC . *G01S 7/12* (2013.01); *G01S 13/02* (2013.01); *G01S 7/22* (2013.01); *G01S 13/9307* (2013.01); *G08G 3/02* (2013.01)

(58) Field of Classification Search
CPC .............. G01S 7/02; G01S 7/04; G01S 7/06; G01S 7/10; G01S 7/12; G01S 7/22; G01S 13/88; G01S 13/93; G01S 13/9307; G01S 13/02; G08G 3/00; G08G 3/02

USPC .............. 342/175–186, 195, 29–51; 701/400, 701/408, 467, 1, 3, 4, 5, 14, 120, 409, 410, 701/445, 446, 448; 382/100, 103; 715/700, 715/764, 781, 804, 805; 340/945, 961, 340/971–980; 375/240, 240.01, 240.08; 345/418, 581, 589, 592, 619, 629, 632, 345/633
See application file for complete search history.

(56) References Cited

U.S. PATENT DOCUMENTS 3,925,750 A * 12/1975 Gilbert et al. ................. 340/961
4,155,085 A * 5/1979 Warnock et al. .............. 342/182
4,313,115 A * 1/1982 O'Sullivan ..................... 342/41
(Continued)

FOREIGN PATENT DOCUMENTS

JP 5-80143 A 4/1993
JP 11-132777 A 5/1995
(Continued)

*Primary Examiner* — Bernarr Gregory
(74) *Attorney, Agent, or Firm* — Global IP Counselors, LLP

(57) ABSTRACT

This disclosure provides an information display device. The information display device includes an acquirer for acquiring positional information on one or more display targets including at least one of a landmark serving as a reference mark used when a movable body is in move, another movable body, and a location registered by an operator, and a controller for displaying positional information and circumferential information on the movable body in an information display area, associating at least one of the one or more display targets of which a position is outside the information display area with a direction to which the at least one of the one or more display targets is located centering on the movable body, and displaying the at least one of the one or more display targets in an outer circumferential area of the information display area.

18 Claims, 10 Drawing Sheets

(51) Int. Cl.
*G01S 7/00* (2006.01)
*G01S 13/00* (2006.01)

(56) References Cited

U.S. PATENT DOCUMENTS

| | | | | |
|---|---|---|---|---|
| 4,405,943 A | * | 9/1983 | Kanaly | 375/240.08 |
| 4,706,090 A | * | 11/1987 | Hashiguchi et al. | 342/41 |
| 5,798,733 A | * | 8/1998 | Ethridge | 701/410 |
| 6,289,277 B1 | * | 9/2001 | Feyereisen et al. | 701/467 |
| 6,449,556 B1 | * | 9/2002 | Pauly | 701/467 |
| 6,828,922 B1 | * | 12/2004 | Gremmert et al. | 701/14 |
| 6,995,690 B1 | * | 2/2006 | Chen et al. | 701/4 |
| 7,307,578 B2 | * | 12/2007 | Blaskovich et al. | 342/29 |
| 7,375,678 B2 | * | 5/2008 | Feyereisen et al. | 342/180 |
| 7,456,847 B2 | * | 11/2008 | Krajec | 701/408 |
| 7,477,985 B2 | * | 1/2009 | Shirley et al. | 701/120 |
| 7,495,601 B2 | * | 2/2009 | Blaskovich et al. | 342/29 |
| 7,724,177 B2 | * | 5/2010 | Bunch et al. | 342/182 |
| 7,917,289 B2 | * | 3/2011 | Feyereisen et al. | 701/448 |
| 7,956,798 B2 | * | 6/2011 | Yanagi et al. | 342/176 |
| 8,229,163 B2 | * | 7/2012 | Coleman et al. | 382/103 |
| 8,368,585 B2 | * | 2/2013 | Kondo et al. | 342/41 |
| 8,493,412 B2 | * | 7/2013 | Suddreth et al. | 701/3 |
| 8,566,012 B1 | * | 10/2013 | Shafaat et al. | 701/120 |
| 2006/0005147 A1 | * | 1/2006 | Hammack et al. | 715/805 |
| 2011/0066362 A1 | * | 3/2011 | He | 701/120 |

FOREIGN PATENT DOCUMENTS

| | | |
|---|---|---|
| JP | 8-105954 A | 4/1996 |
| JP | 9-229710 A | 9/1997 |

* cited by examiner

| KINDS OF DISPLAY TARGETS | DISPLAY ALLOWED DISTANCE RANGE |
|---|---|
| PORT | AA m |
| LIGHTHOUSE | BB m |
| BUOY ON SHIPPING ROUTE | CC m |
| | |
| ANOTHER SHIP (AIS) | DD m |
| ANOTHER SHIP (TT) | EE m |
| | |

FIG. 4A

| KINDS OF DISPLAY TARGETS | DISPLAY ALLOWED AZIMUTH RANGE |
|---|---|
| PORT | AA' DEGREES FROM FORWARD DIRECTION |
| LIGHTHOUSE | BB' DEGREES FROM FORWARD DIRECTION |
| BUOY ON SHIPPING ROUTE | CC' DEGREES FROM FORWARD DIRECTION |
| | |
| ANOTHER SHIP (AIS) | DD' DEGREES FROM FORWARD DIRECTION |
| ANOTHER SHIP (TT) | EE' DEGREES FROM FORWARD DIRECTION |
| | |

FIG. 4B

INFORMATION DISPLAY DEVICE, INFORMATION DISPLAY METHOD, AND RADAR APPARATUS

CROSS-REFERENCE TO RELATED APPLICATION(S)

The application claims priority under 35 U.S.C. §119 to Japanese Patent Application No. 2011-101218, which was filed on Apr. 28, 2011, the entire disclosure of which is hereby incorporated by reference.

TECHNICAL FIELD

The present invention relates to an information display device, an information display method and a radar apparatus.

BACKGROUND OF THE INVENTION

Conventionally, ship radar apparatuses that can display an image (radar image) showing target object(s) around a ship and can change a scale size of the radar image have been known. JP08-105954A discloses such a ship radar apparatus. With a large scale size, although only the radar image for a narrow range close to the ship is displayed, detailed position (s) and shape(s) of echo(s) showing the target object(s) can be grasped. On the other hand, with a small scale size, although the radar image for a wide range can be displayed, it becomes hard to grasp the position(s) and shape(s) of the echo(s) in detail.

Therefore, with the ship radar apparatus with the configuration above, the scale size is required to be changed manually according to a situation. In addition to the ship radar apparatus, the change is similarly required for, for example, a radar apparatus installed on the ground (JP05-080143A) and a vehicle navigation apparatus (JP11-132777A).

Note that JP05-080143A discloses a configuration for displaying display targets by using different marks for each kind thereof (e.g., people, combat vehicles, and combat airplanes). JP11-132777A discloses a configuration for displaying a map and landmarks around a vehicle, and in which detailed information on the landmarks (e.g., if the landmark indicates a store, business hours) is displayed.

The scale size is required to be changed according to the situation in the configurations disclosed in JP08-105954A, JP05-080143A, and JP11-132777A, whereas JP09-229710A discloses a ship navigation apparatus that can change its scale size automatically. In the ship navigation apparatus disclosed in JP09-229710A, a route (shipping route) can be set. The set route and a position of a ship are displayed on a display unit provided in the ship navigation apparatus. Further, when the ship moves away from the set route, the scale size is automatically reduced. In this manner, the ship and the route can be displayed at all times without changing the scale size manually.

However, with the configuration in JP09-229710A, although the manual change of scale size is not required when the ship has moved away from the route, in a case of, for example, referring a detailed nautical chart for an area close to the ship, the scale size is required to be enlarged manually. Moreover, in the state with the enlarged scale size, problems may arise that the set route may not be referred and, for example, a port far from the ship may not be referred. Therefore, even with the configuration in JP09-229710A, there is a case where the scale size needs to be changed frequently.

SUMMARY OF THE INVENTION

The present invention is made in view of the above situations, and provides an information display device that can display detailed information of an area close to a predetermined spot (e.g., a position of a movable body) and information of an area far from the spot simultaneously.

According to one aspect of the invention, an information display device is provided. The information display device includes an acquirer for acquiring positional information on one or more display targets including at least one of a landmark serving as a reference mark used when a movable body is in motion, another movable body, and a location registered by an operator, and a controller for displaying positional information and circumferential information on the movable body in an information display area, associating at least one of the one or more display targets of which a position is outside the information display area with a direction to which the at least one of the one or more display targets is located centering on the movable body, and displaying the at least one of the one or more display targets in an outer circumferential area of the information display area.

In this manner, the operator can know the direction (e.g., orientation) of the movable body's location with respect to, for example, the landmark, while also determining the positions (and shapes) of the other movable body and the echo(es) that exist close to the movable body.

The display target to be displayed in the outer circumferential area of the information display area may be determined based on a predetermined display condition.

In this manner, by setting the display conditions so that only a display target required by the operator is displayed, the number of the display targets to be displayed in the outer circumferential area is reduced, thereby facilitating the viewing of the display.

The display condition may include a distance from a position corresponding to the center of the information display area to the display target in the display condition.

In this manner, when the position corresponding to the center of the radar image display area is the position of the movable body, by setting the condition for, for example, displaying only display targets within a predetermined distance from the movable body, a display target having a possibility of approaching the movable body can be identified (e.g., determined) and displayed.

The display condition may include a direction (e.g., orientation) of the display target's location with respect to a position corresponding to the center of the information display area.

In this manner, when the position corresponding to the center of the radar image display area is the position of the movable body, by setting the condition for, for example, displaying only display targets within a predetermined angle range with respect to a travel direction of the movable body, a display target having a possibility of approaching the movable body can be identified (e.g., determined) and displayed.

The display condition may include a kind of the display target.

In this manner, when a position of a landmark is not required, by setting a display condition for, for example, not displaying the landmark, a required display target can be identified (e.g., determined) and displayed.

The display condition may include a first display condition for not displaying the display target that is currently displayed, and a second condition for displaying the display target that is currently not displayed, the second condition being different from the first display condition.

In this manner, the display condition for determining whether to hide the display target that is currently displayed and the display condition for determining whether to display the display target that is currently not displayed can be different. Therefore, a display target that has appeared once in the radar image display area does not quickly disappear from the radar image display area, and the positional relation of the display target with respect to the movable body can be easily determined.

A display manner of the display target to be displayed in the outer circumferential area of the information display area may be changed based on a distance of the display target from a position corresponding to the center of the information display area.

In this manner, the operator can quickly and easily determine the distance to the display target displayed in the outer circumferential area.

The display manner may include at least one of size, color and transparency of the display target to be displayed in the outer circumferential area of the information display area.

In this manner, the operator can quickly and easily determine the distance to the display target displayed in the outer circumferential area.

In accordance with one or more other aspects, the information display device may further include a user interface for allowing the operator to select the display target displayed in the outer circumferential area of the information display area. The controller may display the distance from a position corresponding to the center of the information display area for the display target selected by the user interface.

In this manner, the operator can know, in addition to the direction to which the display target displayed in the outer circumferential area is located, the distance to which the display target is located. Further, the distance information is displayed only when needed, therefore preventing any degradation in the visibility of the display.

In accordance with one or more other aspects, the information display device may further include a user interface for allowing the operator to change a state of the display target between displayed and not displayed and at least one of size, color and transparency of the display target.

In this manner, for example, by hiding the display target and changing the color of the display target on a display unit through the user interface, the information display device can flexibly support usage situations and one or more preferences of the operator.

In accordance with one or more other aspects, the information display device may further include a display target information storage for storing a terrestrial reference position of the landmark in advance.

In this manner, the landmark can be displayed on the display without performing the processing of acquiring the position of the landmark externally.

The display target other than the at least one of the one or more display targets of which the position is outside the information display area may be displayed in the information display area.

In this manner, even when the movable body approaches the display target, the operator can determine the direction to which the display target is located.

According to another aspect of the invention, a radar apparatus carried in a ship and having a radar antenna is provided. The radar apparatus includes an acquirer for acquiring positional information on one or more display targets including at least one of a landmark serving as a reference mark used when a movable body is in motion, another movable body, and a location registered by an operator, and a controller for displaying positional information and circumferential information on the movable body in an information display area, associating at least one of the one or more display targets of which a position is outside the information display area with a direction to which the at least one of the one or more display targets is located centering on the movable body, and displaying the at least one of the one or more display targets in an outer circumferential area of the information display area. The display target is displayed in the information display area so as to be superimposed on a radar image.

In this manner, the landmark and another ship located outside the information display area can be displayed while displaying in detail the echo for around the ship in the information display area by enlarging the radar image.

BRIEF DESCRIPTION OF THE DRAWINGS

The present disclosure is illustrated by way of example and not by way of limitation in the figures of the accompanying drawings, in which the like reference numerals indicate like elements and in which:

FIG. 4A is a chart showing an example of a display condition, and FIG. 4B is a chart showing an example of another display condition;

DETAILED DESCRIPTION

Figure 1:
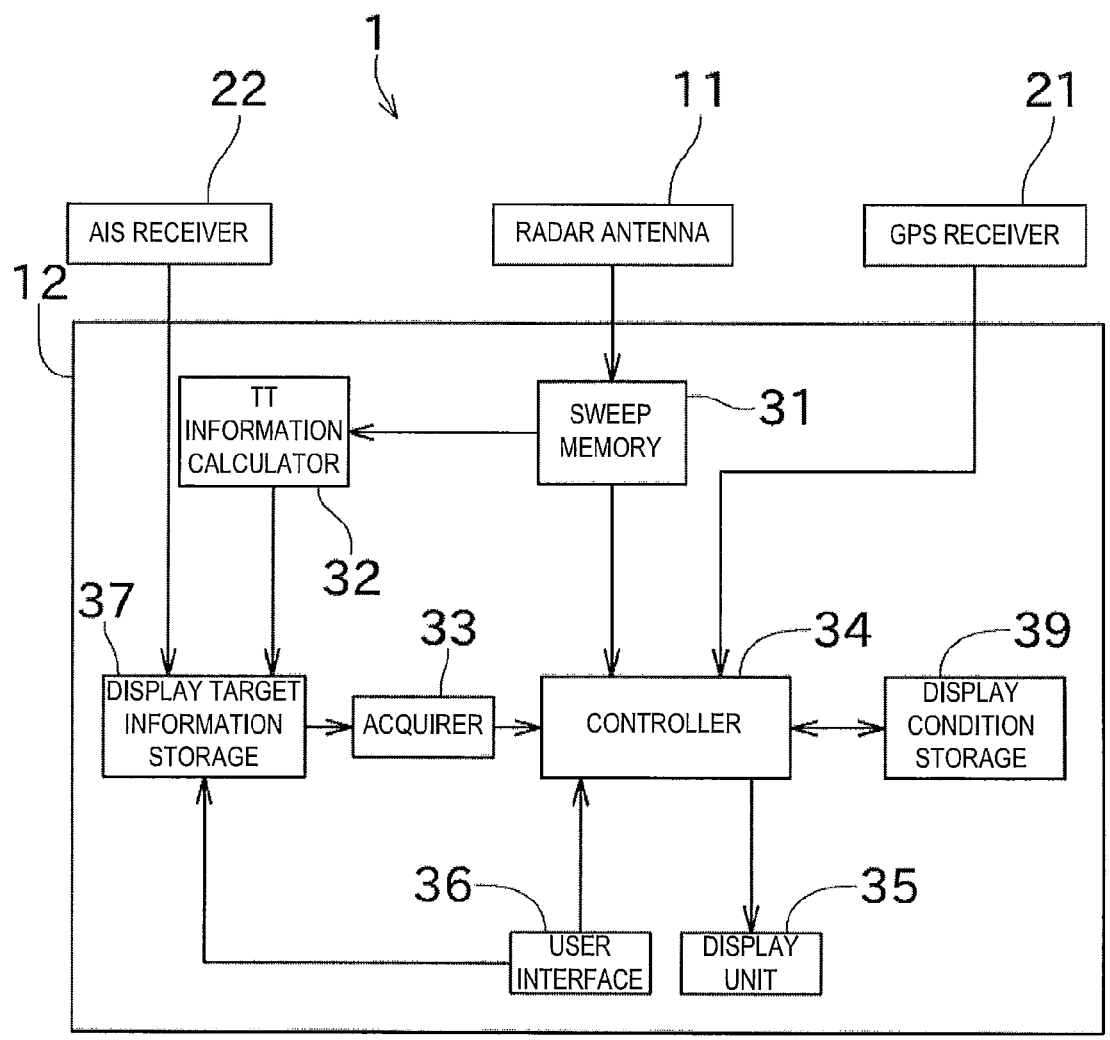
FIG. 1 is a block diagram of a radar apparatus according to an embodiment of the invention.
Figure 2:
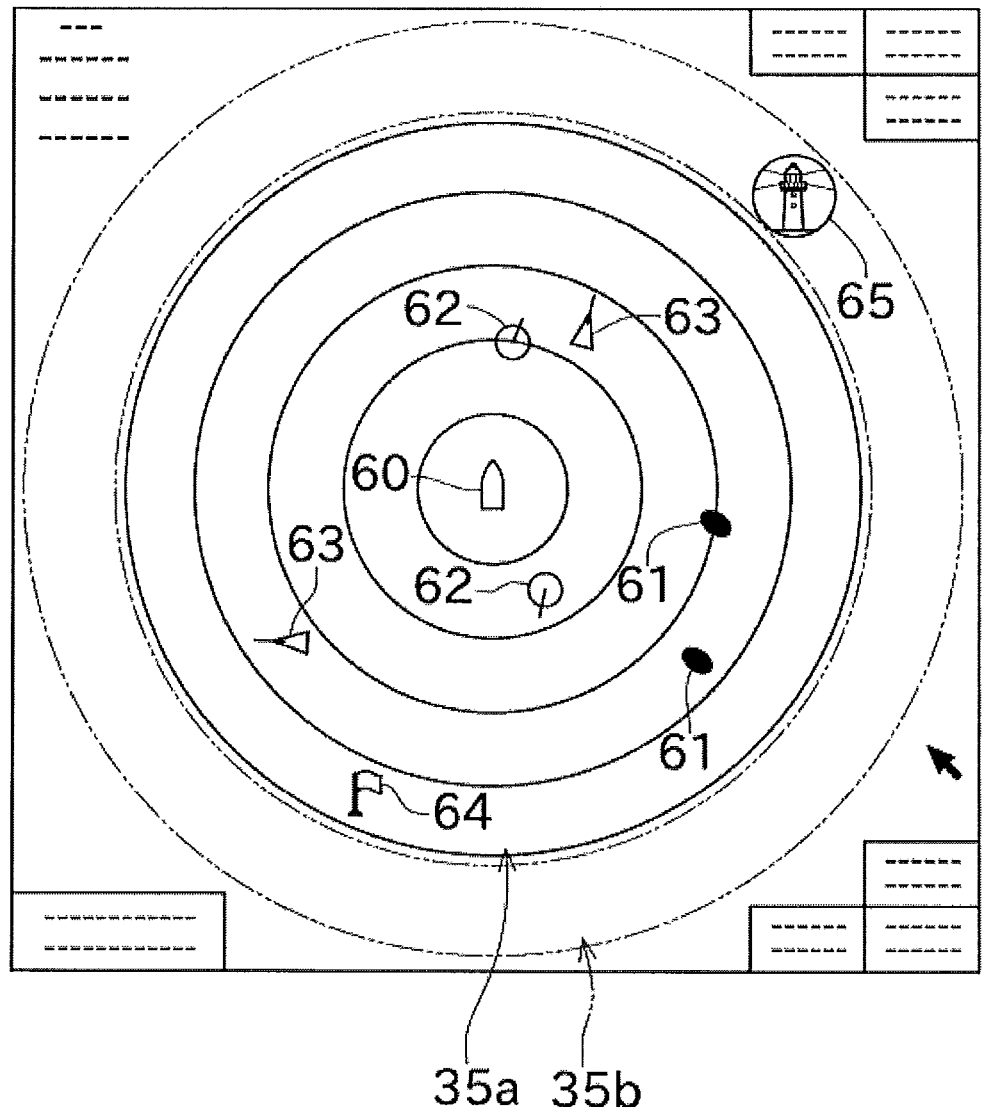
FIG. 2 is a view showing an example of a screen image displayed on a display unit.

Next, an embodiment of the invention is explained with reference to the appended drawings. FIG. 1 is a block diagram of a ship radar apparatus 1 according to this embodiment. FIG. 2 is a view showing an example of a screen image displayed on a display unit 35.

As shown in FIG. 1, the ship radar apparatus 1 includes a radar antenna 11 and a radar instruction unit 12 (information display device).

The ship radar apparatus 1 is configured as a pulse radar apparatus. Note that, either one of a CW (continuous wave) radar and a pulse doppler radar may be used as an alternative to the pulse radar. The radar antenna 11 transmits a pulse-shaped electric wave having a strong directivity and receives a reflection wave (echo) that is the pulse-shaped electric wave reflected on and returned back from a target object. Further, the radar antenna 11 repeatedly transmits the pulse-shaped electric wave and receives the reflection wave while horizontally revolving. With the above configuration, a scan can be performed horizontally over 360° centering on a ship (which may sometimes be referred to herein as "the ship concerned", the "moveable body", or may be simply referred to as "the ship"). Note that, alternative to the radar apparatus of this embodiment, a radar apparatus having a configuration in which the radar antenna does not revolve may be used. For example, with either one of a radar apparatus having a configuration with antenna elements in the entire circumferential direction and a radar apparatus for detecting only a particular direction (e.g., forward), the radar antenna is not required to revolve.

The signal received by the radar antenna 11 is converted into digital data by performing A/D conversion in a reception circuit (not illustrated), and outputted to the radar instruction unit 12.

The radar instruction unit 12 includes a sweep memory 31, a TT information calculator 32, an acquirer 33, a controller 34, a display unit 35, a user interface 36, a display target information storage 37, and a display condition storage 39. Moreover, the radar instruction unit 12 is connected with the radar antenna 11 as well as a GPS receiver 21 and an AIS receiver 22.

The data outputted from the radar antenna 11 is inputted to the sweep memory 31. The sweep memory 31 can store data for one revolution of the radar antenna 11. Because the data for one revolution of the radar antenna 11 is data obtained from scanning horizontally over 360° centering on the ship, a two dimensional image (radar image) showing a state of the target object around the ship (a correlation position of the target object with respect to the ship) is stored in the sweep memory 31.

The controller 34 includes a CPU or other processor for executing various programs, and a non-volatile memory, such as Read Only Memory (ROM), for storing a program for displaying the radar image on the display unit 35, as its main components. Specifically, the controller 34 reads out the radar image stored in the sweep memory 31 and can display it on the display unit 35 configured as, for example, a liquid crystal display unit.

The display unit 35 displays the radar image and various voyage information. The display unit 35 displays the radar image in a radar image display area 35a (information display area) shown in FIG. 2. In this embodiment, the radar image display area 35a is formed in a circle and, at a center thereof, a ship mark 60 indicating the ship is displayed. Further, echoes 61 of target objects located within a predetermined distance from the ship are displayed in the radar image display area 35a. Thus, positional information of the ship (movable body) and circumferential information (e.g., information about an area surrounding the ship) of the ship are displayed on the radar image display area 35a. Note that, an outer circumferential area 35b formed in a ring shape to surround the radar image display area 35a is formed on the display unit 35. Note that, the chain line shown in FIG. 2 is drawn to clarify the range of the outer circumferential area 35b and may not be displayed on the display unit 35 practically.

The TT information calculator 32 is for achieving a TT (Target Tracking) function. Although a detailed explanation of the TT (or ARPA) function is omitted because it is known, the function estimates a velocity vector by automatically detecting and acquiring the position of the target object based on the data stored in the sweep memory 31 and tracking the movement of the target object based on a time transition. Note that, the information on the target object obtained by the TT function is relative information with respect to the ship. Therefore, the TT information calculator 32 can calculate information on, for example, the relative position of the target object (the distance from the ship and an azimuth seen from the ship), and a relative velocity of the target object with respect to the ship. The information (TT information) calculated by the TT information calculator 32 is outputted to the display target information storage 37.

Further, the ship radar apparatus 1 is connected with the AIS receiver 22. The AIS receiver 22 receives AIS information outputted from an AIS (Automatic Identification System) mounted on another ship (another movable body). The AIS signal contains information on, for example, a position, a ship velocity, and a course of the other ship. The information on the other ship contained in the AIS signal is absolute terrestrial reference information. Note that in the explanation below an absolute terrestrial reference position (longitude and latitude) is referred to as an absolute position. The AIS information received by the AIS receiver 22 from the other ship is outputted to the display target information storage 37.

The display target information storage 37 stores the AIS information and the TT information obtained in the manner described above. Further, the display target information storage 37 stores information relating to a landmark and an operator registered location, in addition to the information above.

A landmark is a reference mark used when the ship is in travel. Specific examples of a landmark used during a voyage include a lighthouse, a port, a mountain, an island, and a buoy on a shipping route. Note that, the concept of the landmark in this embodiment includes a reference mark arranged on a land and, in addition, a reference mark arranged on the sea, such as the buoy on the shipping route. The display target information storage 37 stores an absolute position of the landmark and an icon indicating the landmark in advance.

The operator registered location is a position registered by an operator (e.g., a position where a large amount of fish have been caught in the past). The operator can register, for example, a current position of the ship as the operator registered location by operating the user interface 36. When the controller 34 receives an instruction to create the operator registered location, it stores, in the display target information storage 37, the current absolute position of the ship acquired from the GPS receiver 21 and the icon indicating the operator registered location.

As described above, the display target information storage 37 stores the relative position of the target object (e.g., the other ship) based on the TT information, the absolute position of the other ship based on the AIS information, the absolute position of the landmark, and the absolute position of the operator registered location. Note that, because the other ship, the landmark, and the operator registered location are displayed on the display unit 35 (specifically, in the radar image display area 35a and the outer circumferential area 35b), in the explanation below, they may simply be referred to as "the display targets."

The acquirer 33 accesses the display target information storage 37 and acquires the positional information of the display target. Further, the acquirer 33 outputs the acquired positional information to the controller 34. The controller 34 displays the display target on the display unit 35 based on the positional information of the display target.

Figure 3:
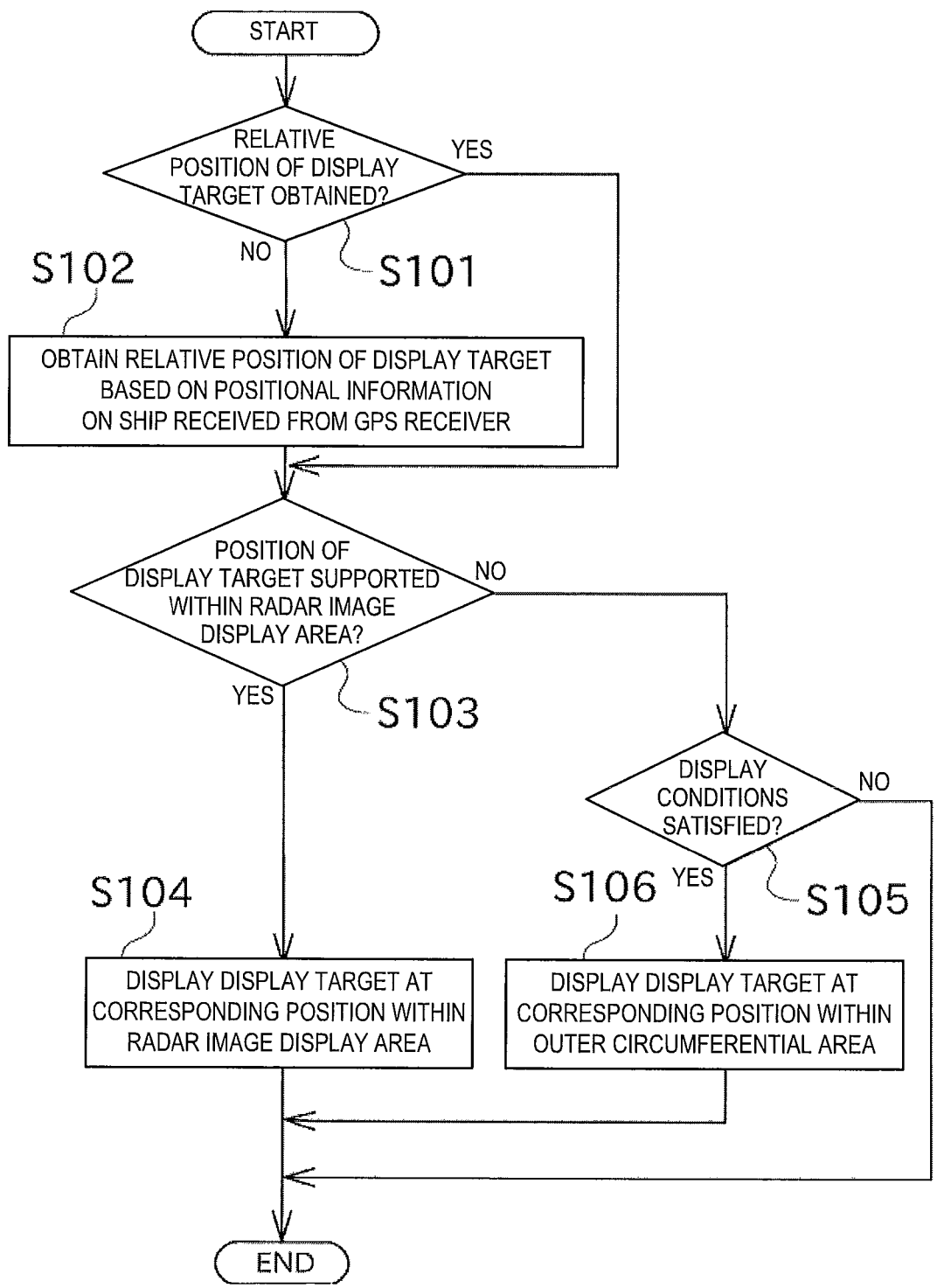
FIG. 3 is a flowchart showing processing that is performed by a controller so as to display a display target.

Hereinafter, processing that is performed by the controller 34 so as to display the display on the display unit 35 is explained with reference to the flowchart in FIG. 3. FIG. 3 is a flowchart showing the processing that is performed by the controller 34 so as to display the display target.

First, the controller 34 determines whether the relative position of the display target (the distance from the ship and the azimuth seen from the ship) has already been obtained (S101). If the relative position has not been obtained, that is, if the relative position of the display target other than the other ship is not obtained based on the TT information, it is calculated based on the absolute position of the display target and the absolute position of the ship obtained from the GPS receiver 21 (S102). Note that, where the relative position of the other ship obtained based on the TT information has already been obtained, the processing at Step S102 is not performed.

Next, the controller 34 determines whether the position of the display target is supported within the radar image display area 35a based on the distance from the ship to the display target (S103). Thus, because the radar image for the area within the predetermined distance from the ship is displayed in the radar image display area 35a, the controller 34 determines whether the distance from the ship to the display target (hereinafter, may simply be referred to as "the distance of the display target") is longer than the predetermined distance.

If the distance from the ship to the display target is shorter than the predetermined distance, the display target is displayed at a position supported within the radar image display area 35a (S104). Here, as shown in FIG. 2, the display target is displayed by using any one of a TT symbol 62, an AIS symbol 63, a operator registered icon 64, and a landmark icon 65.

On the other hand, if the distance from the ship to the display target is longer than the predetermined distance (when the position of the display target corresponds to an area outside the radar image display area 35a), the controller 34 determines whether the display target satisfies predetermined display conditions (S105). The display conditions are set to prevent the display target from being difficult to view because, for example, a plurality of symbols are arranged in the outer circumferential area 35b. Therefore, only the display target satisfying the display conditions is displayed in the outer circumferential area 35b. The display condition storage 39 stores information relating to the display conditions.

In this embodiment, as the display conditions, only the display target within the predetermined distance (hereinafter, referred to as the display allowed distance range) from the position of the ship (the position corresponding to the center of the radar image display area 35a) is displayed, and the display allowed distance range is different for every kind of the display targets. Specifically, as shown in FIG. 4A, the display condition storage 39 stores the kinds of display targets and the display allowed distance range for each display target in correspondence with each other.

In this manner, for example, a port serving as a landmark can be displayed in the outer circumferential area 35b even if it is located far in distance from the ship, whereas the other ship that is located far in distance may not be displayed in the outer circumferential area 35b. Note that, the display allowed distance range may be changed by the operator. Further, the display allowed distance range may be changed automatically according to the scale size of the radar image display area 35a.

Further, when the position of the display target is outside the radar image display area 35a and the display conditions are satisfied, the controller 34 displays the display target in the outer circumferential area 35b corresponding to the azimuth where the display target is located with respect to the ship (S106). The display target is displayed by using any of the symbol and the icon even when it is displayed in the outer circumferential area 35b. Sizes of the symbol and the icon displayed in the outer circumferential area 35b are changed according to the distance from the ship to the display target. Note that, for example, colors and transparencies of the symbol and the icon may be changed according to the distance from the ship (the position corresponding to the center of the radar image display area 35a) to the display target.

Note that, when the display conditions are not satisfied, the symbol and the icon are not displayed. As described above, the controller 34 displays the display target in the radar image display area 35a and the outer circumferential area 35b. Thereby, the operator can know the direction to which the ship is located with respect to, for example, the landmark, while also determining in detail the positions and shapes of the other ship and the echo that exist close to the ship.

In the above description, the example in which the display target is displayed based on the distance from the ship to the display target is explained. Alternatively, the display target may be displayed based on the direction to which the display target is located (which may simply be referred to as the azimuth of the display target) with respect to the ship (the position corresponding to the center of the radar image display area 35a). Such a configuration is explained in the following. In this case, as shown in FIG. 4B, the display condition storage 39 stores the kinds of display targets and a display allowed azimuth range of each display target in correspondence with each other. In FIG. 4B, the display allowed azimuth range in right and left directions is defined with respect to a forward azimuth of the ship; however, the reference azimuth is not limited to the forward azimuth of the ship, and an arbitrary azimuth may be used.

Further, in this case, in the above described processing at Step S105 in the flowchart of FIG. 3, the determination of whether to display the display target is performed based on "the azimuth of the display target" and not based on "the distance of the display target."

In this manner, the landmark can be displayed only within a predetermined azimuth range (e.g., only in the forward direction of the ship), and for the other ship (the AIS symbol and the TT symbol), the information for the entire azimuth can be displayed. Note that, as the display conditions of the display target, both of "the distance of the display target" and "the azimuth of the display target" may be set in combination.

Note that, the operator can edit either one of the symbol and the icon through operating, for example, a mouse included in the user interface 36. Specifically, for example, the symbol may be hidden, and the display color and the shape thereof may be changed. In this manner, for example, an unnecessary symbol can be hidden to facilitate viewing the radar image, and the display image to be observed can be changed to have a distinct color. Note that, the user interface for allowing the operator to select, for example, the symbol is not limited to the mouse, and the symbol may be selected through, for example, either one of a direction key and a track ball.

Figure 5:
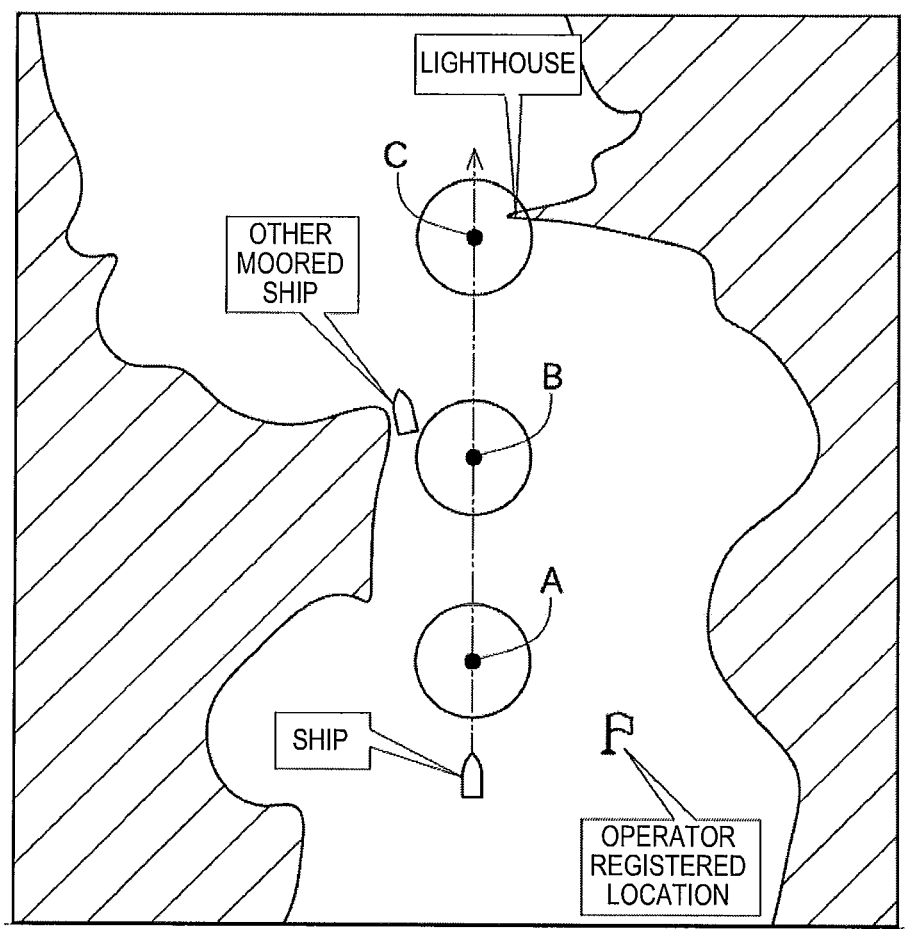
FIG. 5 is an illustrative view showing a positional relation between a ship and display targets.
Figure 6:
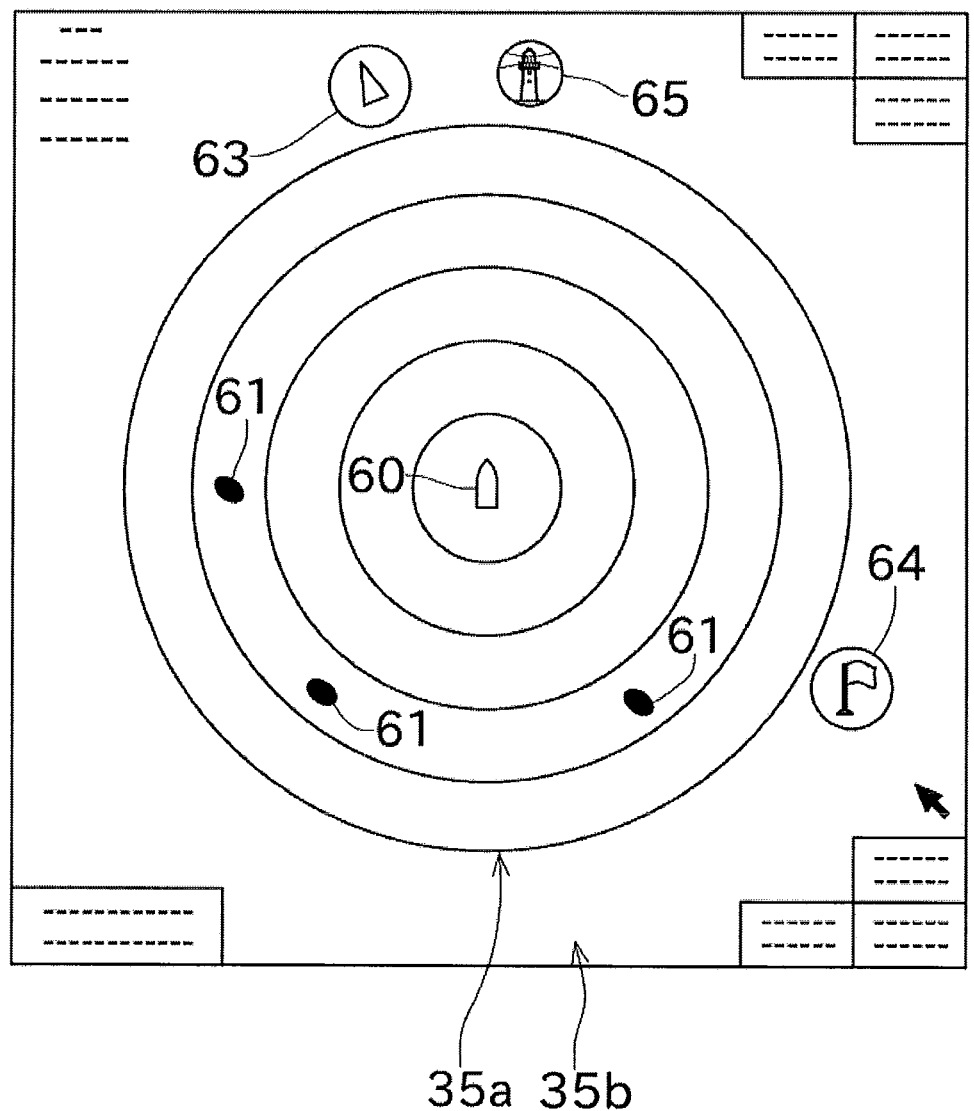
FIG. 6 is a view showing a screen image displayed on the display unit when the ship is at a position A.
Figure 7:
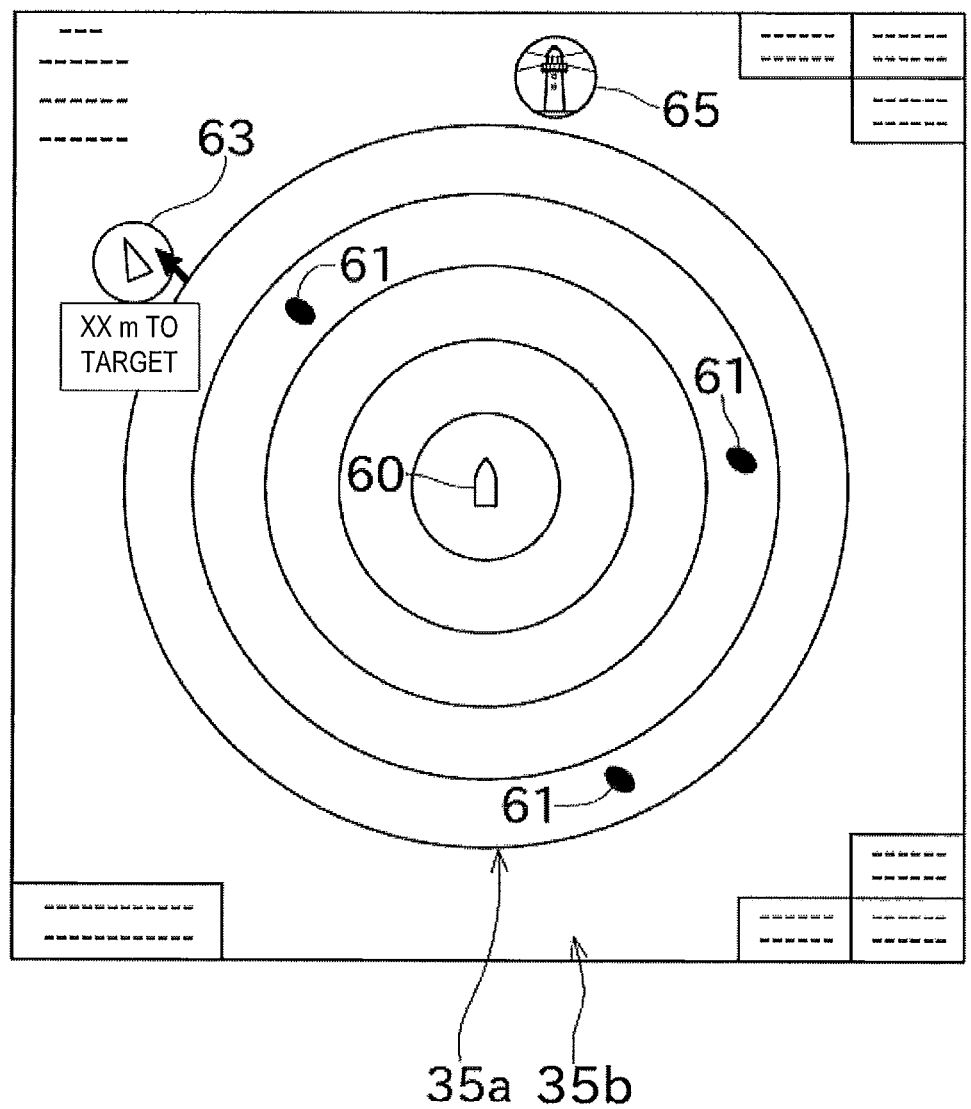
FIG. 7 is a view showing a screen image displayed on the display unit when the ship is at a position B.
Figure 8:
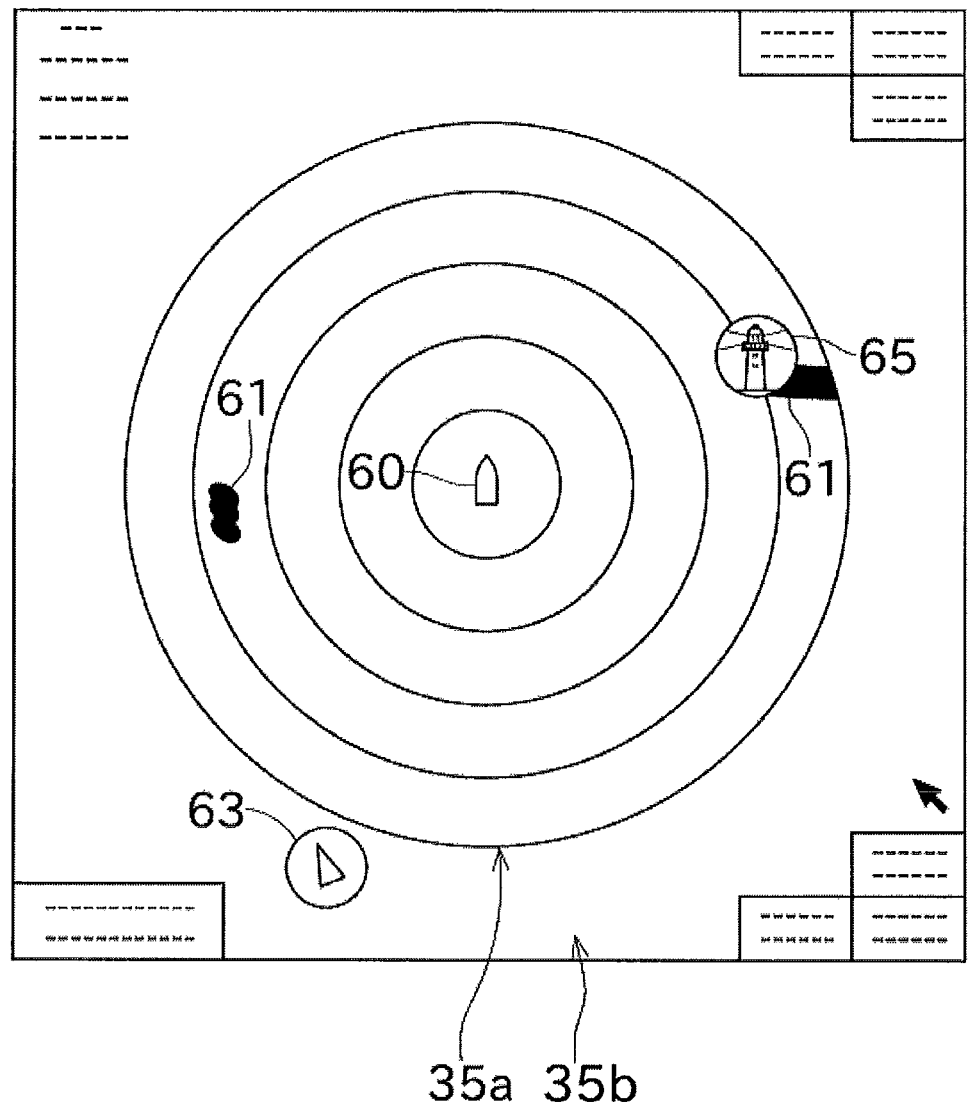
FIG. 8 is a view showing a screen image displayed on the display unit when the ship is at a position C.

Next, a changing state of displayed contents on the display unit 35 according to the movement of the ship is explained with reference to FIGS. 5 to 8. FIG. 5 is an illustrative view showing a positional relation between the ship and the display targets. FIGS. 6 to 8 are views showing screen images displayed on the display unit 35 when the ship is at a position A, a position B, and a position C, respectively.

The example situation shown in FIG. 5 is considered in the following. In FIG. 5, the shaded areas designate two areas of land, and thus the ship is located between the two areas of land. The ship is set a shipping route of voyaging between the lands toward the arrow direction in FIG. 5, through the position A, the position B, and then the position C. Further, the displayed contents on the display unit when the ship is at the position A, the position B, and then the position C are shown in FIGS. 6 to 8, respectively. Further, the circle around each position indicates a display range of the radar image display area 35a when the ship is at the position. Note that, within the range shown in FIG. 5, the landmark (lighthouse), the other ship (the other ship that is moored) from the AIS information, and the operator registered location exist as the display targets.

First, the state in which the ship is at the position A is explained with reference to FIG. 6. Here, in the radar image display area 35a, the echoes 61 constituting the radar image are displayed in addition to the ship mark 60. Further, in the outer circumferential area 35b, the operator registered icon 64 indicating the operator registered location is displayed to correspond to the azimuth seen from the ship, as well as the AIS symbol 63 indicating the other ship that is moored, and the landmark icon 65 indicating the lighthouse are displayed to correspond to the azimuth seen from the ship. Because the lighthouse is located slightly far from the ship, it is drawn smaller than the other symbols and icons. Note that, the distance from the ship to the display target may be shown by, for example, the color and the transparency of the symbols and icons, and not by the size thereof as described above. For example, the symbol or icon for a display target may be displayed in lighter color (or higher transparency) as the display target is further distant from the ship. Note that, the above manners of changing the symbol and icon may be combined to display them. For example, the symbol and icon may be displayed in smaller size and also in lighter color (or higher transparency) as the display target is further distant from the ship.

Next, the state in which the ship arrives the position B is explained with reference to FIG. 7. Here, in the radar image display area 35a, similar to the state in which the ship is at the position A, the ship mark 60 and the echoes 61 constituting the radar image are displayed. On the other hand, the operator registered icon 64 that is displayed when the ship is at the position A is not displayed here, because the operator registered location is located farther than the display allowed distance range. In the outer circumferential area 35b, similar to the state in which the ship is at the position A, the AIS symbol 63 and the landmark icon 65 are displayed to correspond to the azimuth seen from the ship.

Further, in this embodiment, by moving the mouse of the user interface 36 and clicking (or placing the mouse cursor), for example, the symbol and icon displayed in the outer circumferential 35b, the distance to the display target is displayed (see FIG. 7). Further, the landmark icon 65 is displayed in larger size than the state in which the ship is at the position A because the distance thereto from the ship is comparatively closer.

Next, the state in which the ship arrives the position C is explained with reference to FIG. 8. Here, the position of the lighthouse is supported in the radar image display area 35a; therefore, in the radar image display area 35a, the landmark icon 65 indicating the lighthouse is displayed, in addition to the ship mark 60 and the echoes 61 (including the echo of land where the lighthouse is built). Further, in the outer circumferential area 35b, the AIS symbol 63 is displayed to correspond to the azimuth seen from the ship.

Figure 9:
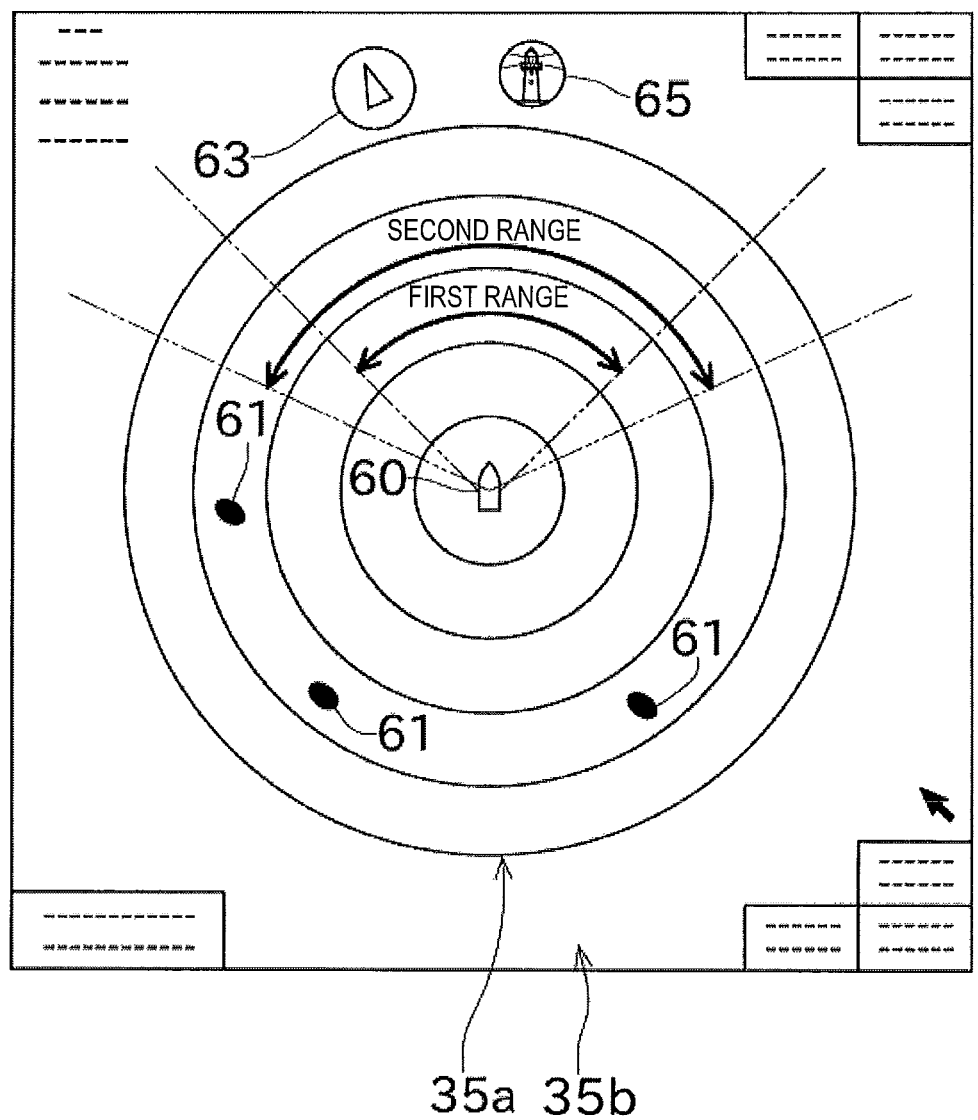
FIG. 9 is a view showing a screen image displayed on the display unit when the ship is at a position A in a modified example of the invention.
Figure 10:
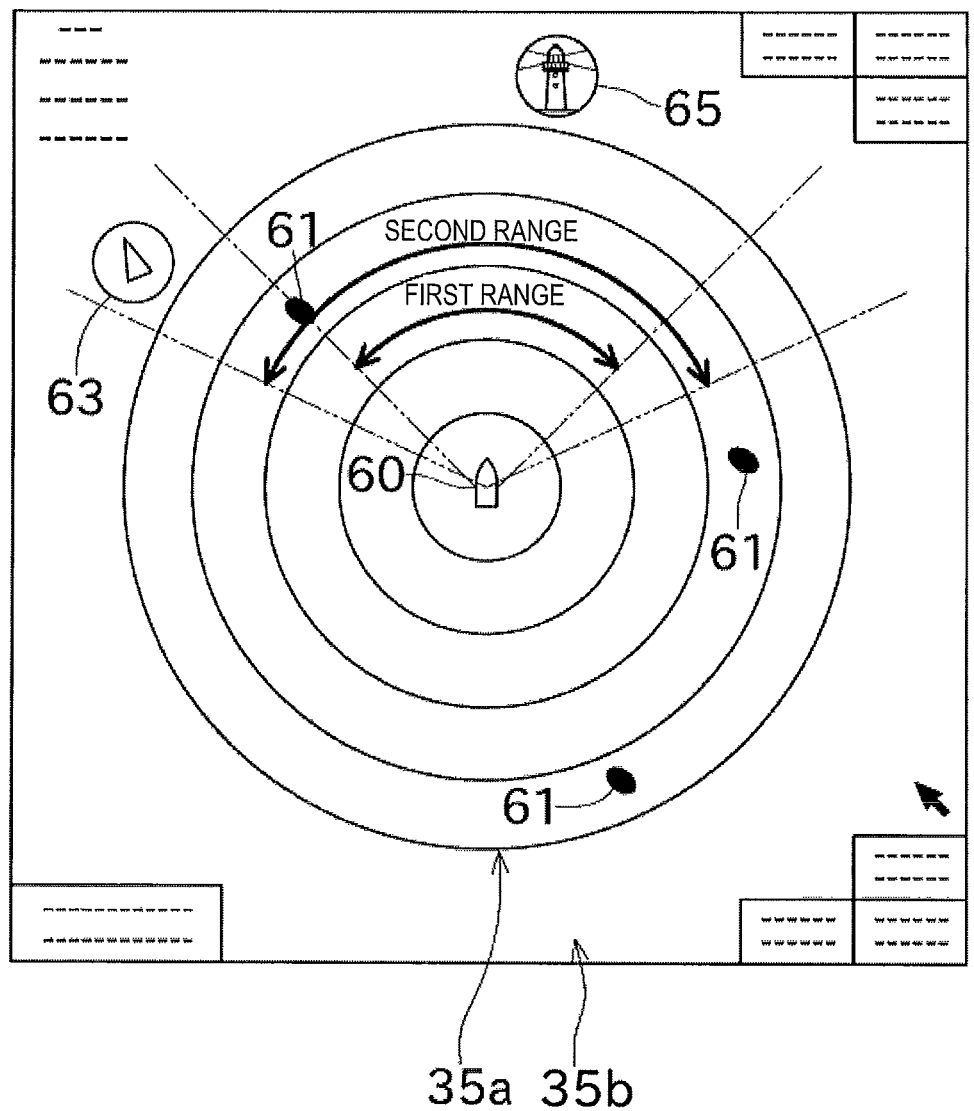
FIG. 10 is a view showing a screen image displayed on the display unit when the ship is at a position B in the modified example of the invention.

Next, a modification of this embodiment is explained. FIGS. 9 and 10 are views showing screen images displayed on the display unit 35 when the ship is at the position A and the position B, respectively. Note that, in the explanation of the modification, the same numerals are applied to the same or similar members as the above embodiment, and the explanation thereof may be omitted.

With the ship radar apparatus 1, display conditions are set according to the direction to which the display target is located with respect to the position of the ship (the position corresponding to the center of the radar image display area 35a). Further, the display condition for hiding the display target that is currently displayed on the display unit 35, and the display condition for displaying the display target that is currently not displayed on the display unit 35 are constituted differently from each other.

Hereinafter, the display conditions are explained specifically with reference to FIG. 9. Note that, FIG. 9 shows the similar situation as the case of FIG. 5 in this embodiment. As shown in FIG. 9, the ship radar apparatus 1 is set with a range (first range) surrounded by virtual lines drawn rightward and leftward respectively, at a predetermined angle with respect to the traveling direction of the ship, and a second range surrounded by virtual lines drawn at a larger angle than the first range. The display target is set so that, when the display target is currently displayed on the display unit 35, the display target remains on the display unit even if it is located outside the first range, and the display target is excluded from the display only when it is located outside the second range (the display condition for hiding the display target that is currently displayed on the display unit 35). On the other hand, the display target is set so that, when the display target is currently not displayed on the display unit 35, the display target appears on the display unit under the condition in which it is located within the first range (the display condition for displaying the display target that is currently not displayed on the display unit 35).

As shown in FIG. 9, when the ship is at the position A, the AIS symbol 63 and the landmark icon 65 are displayed in the outer circumferential area 35b. Further, when the ship moves from the position A to the position B, although the AIS symbol 63 is located outside the first range as shown in FIG. 10, because it is located within the second range, the AIS symbol 63 remains being displayed in the outer circumferential area 35b. Because the landmark icon 65 is located within the second range even after the ship moves to the position B, it remains being displayed in the outer circumferential area 35b. Note that, as described above, the display targets other than these are displayed in the outer circumferential area 35b only when they are located within the first range.

By setting the display conditions asymmetrically as described above, the display target is prevented from repeatedly appearing in and vanishing from the outer circumferential area 35b, and the position of the ship can be easily determined.

As described above, in this embodiment, the radar instruction unit 12 includes the acquirer 33 and the controller 34. The acquirer 33 acquires the positional information on the display target constituted with at least one of the other movable body (the other ship), the landmark serving as a reference mark used when the ship is in travel (during a voyage), and the position registered by the operator (operator registered location). The controller 34 displays the positional information on the ship and the circumferential information on the ship in the radar image display area 35a, and at least one display target of which the position is outside the radar image display area 35a is associated with the direction where the display target is located, and displayed in the outer circumferential area 35b of the radar image display area 35a. Note that, the display target can be displayed in the radar image display area 35a.

In this manner, the operator can know the directional orientation of the ship with respect to, for example, a location of a landmark, while also determining the positions (and shapes) of the other ship and the echo(es) that exist in an area close to the ship.

Further, in this embodiment, the radar instruction unit 12 determines the display target displayed in the outer circumferential area 35b of the radar image display area 35a based on the predetermined display conditions.

In this manner, by setting the display conditions so that only the display target required by the operator is displayed, the number of display targets displayed in the outer circumferential area 35b is reduced, thereby facilitating the viewing of the display unit 35.

Further, in this embodiment, the radar instruction unit 12 uses the distance from the position corresponding to the center of the radar image display area 35a (the position of the ship) to the display target, for the display conditions.

In this manner, a display target having a possibility of approaching the ship can be identified (e.g., determined) and displayed.

Moreover, in this modification, the radar instruction unit 12 uses, as the display conditions, the direction (e.g., orientation) of the display target with respect to the position corresponding to the center of the radar image display area 35a (the position of the ship).

In this manner, a display target having a possibility of approaching the ship can be identified (e.g., determined) and displayed.

Moreover, in this embodiment, the radar instruction unit 12 uses the kind of display target as the display conditions.

Thus, the kind of display target and the distance to the display target are used for the display condition for that display target. Therefore, a display target required by the operator can be identified (e.g., determined) and displayed in an effective manner.

Further, in this modification, a display condition applied to a display target that is currently displayed and a display condition applied to a display target that is currently not displayed are different from each other.

In this manner, whether to display a particular display target can be determined while discriminating between a display target previously displayed and a display target that has not been displayed. Therefore, the display target that has appeared once in the radar image display area does not quickly disappear from the radar image display area, and the positional relation of the display target with respect to the ship can be easily determined.

Moreover, in this embodiment, the sizes of the symbols and icons of the display targets displayed in the outer circumferential area 35b of the radar image display area 35a are changed based on the distance from the position corresponding to the center of the radar image display area 35a. Further, alternative to the size, either one of the color and transparency of the symbols and icons of the display targets may be changed.

In this manner, the operator can quickly and easily determine the distance to a display target displayed in the outer circumferential area 35b.

Further, in this embodiment, the radar instruction unit 12 includes the user interface 36 (including, for example, a mouse) through which the operation of selecting the display target displayed in the outer circumferential area 35b of the radar image display area 35a can be performed. The controller 34 displays the distance of the display target selected through the mouse, from the position corresponding to the center of the radar image display area 35a.

In this manner, the operator can know, in addition to the direction to which the display target displayed in the outer circumferential area 35b is located, the distance at which the display target is located. Further, the distance information is displayed only when needed, therefore preventing any degradation in the visibility of the display unit 35.

Further, in this embodiment, the radar instruction unit 12 includes a user interface 36 for changing the displaying and not displaying of the display target, and the display color on the display unit 35.

In this manner, the radar instruction unit 12 can flexibly support usage situations and one or more preferences of the operator.

Further, in this embodiment, the radar instruction unit 12 includes the display target information storage 37. The display target information storage 37 stores the terrestrial reference position of a landmark in advance.

In this manner, the landmark can be displayed on the display unit 35 without performing the processing of acquiring the position of the landmark externally.

As above, the preferred embodiment and the modification thereof are explained; however, the above configuration may be changed, for example, as follows.

The radar image display area 35a may not be limited to the circle shape and may be a rectangular shape. In this case, the outer circumferential area 35b is not formed in a ring shape but formed in a frame shape. Further, in addition to the configuration where the ship is arranged at the center, a predetermined spot may be arranged at the center and a display area centering on the spot may be formed.

In this embodiment and the modification thereof, the distance from the ship to the display target is displayed when the mouse cursor is placed on the display target. However, a similar display may be achieved when the display target is selected through the user interface by means other than a mouse (e.g., track ball and operation key). Further, in addition to the distance from the ship to the display target, for example, the direction of the display target's location with respect to the ship and a name of the display target may also be displayed.

For the display conditions, the display condition according to the distance from the display target to the ship and the display condition according to the direction to which the display target is located may be combined. Further, with respect to the display condition according to the distance from the display target to the ship, the display condition may be applied to the display target that is currently displayed on the display unit 35 in a different manner than the display condition is applied to the display target that is currently not displayed on the display unit 35.

In this embodiment and the modification thereof, the size of the symbol (icon) of the display target is changed according to the distance from the display target to the ship. However, the distance from the display target to the ship may be indicated using any suitable manner, such as, the symbol (icon) blinks as the distance to the ship becomes shorter.

The display condition for determining whether to display the display target in the outer circumferential area 35b is not limited to the above examples, and suitable display conditions may be set.

The configuration of the invention is not limited to that of the radar instruction unit of the ship radar apparatus, and may be applied to other ship instruments, such as a plotter device or a scanning sonar. Further, the movable body to which the information display device of the invention is installed is not limited to a ship, and the information display device of the invention may be installed in, for example, aircrafts and automobiles.

In the foregoing specification, specific embodiments of the present invention have been described. However, one of ordinary skill in the art appreciates that various modifications and changes can be performed without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims as issued.

What is claimed is:

1. An information display device installed in a movable body, comprising:
   an acquirer configured to acquire information about a location of at least one display target, the at least one display target including at least one of a landmark, another movable body, and a location designated by a user of the device; and
   a controller configured to display, in an information display area, information about a location of the movable body and information about an area surrounding the location of the movable body, wherein, in response to determining that the location of the at least one display target is outside of the information display area, the controller displays the at least one display target at a location in an outer circumferential area of the information display area indicating a relative position of the at least one display target with respect to the location of the movable body which is indicated by a center of the information display area.

2. The information display device of claim 1, wherein the controller extracts the at least one display target to be displayed in the outer circumferential area of the information display area based on a predetermined display condition.

3. The information display device of claim 2, wherein the predetermined display condition includes a geographical distance between a location corresponding to the center of the information display area and the location of the at least one display target.

4. The information display device of claim 2, wherein the predetermined display condition includes a direction of the location of the at least one display target with respect to a location corresponding to the center of the information display area.

5. The information display device of claim 2, wherein the predetermined display condition includes a kind of the at least one display target.

6. The information display device of claim 1, wherein a display format of the at least one display target to be displayed in the outer circumferential area of the information display area is changed based on a geographical distance between the location of the at least one display target and a location corresponding to the center of the information display area.

7. The information display device of claim 6, wherein the display format includes at least one of size, color and transparency of the at least one display target to be displayed in the outer circumferential area of the information display area.

8. The information display device of claim 1, further comprising:
   a user interface configured to select the at least one display target displayed in the outer circumferential area of the information display area,
   wherein, in response to the at least one display target being selected, the controller displays a geographical distance between the location of the at least one display target and a location corresponding to the center of the information display area.

9. The information display device of claim 1, further comprising:
   a user interface configured to change a display state of the at least one display target between an ON state of being displayed in the outer circumferential area of the information display area and an OFF state of not being displayed in the outer circumferential area of the information display area.

10. The information display device of claim 9, wherein changing the display state of the at least one display target includes changing at least one of size, color and transparency of the at least one display target.

11. The information display device of claim 1, further comprising a display target information storage configured to store a terrestrial reference position of the landmark in advance.

12. The information display device of claim 1, wherein in response to determining that the location of the at least one display target is inside of the information display area, the controller displays the at least one display target in the information display area.

13. A radar apparatus comprising:
   a radar antenna; and
   an information display device, wherein the information display device comprises:
      an acquirer configured to acquire information about a location of at least one display target with respect to a movable body, the at least one display target including at least one of a landmark serving as a reference mark used when the movable body is in motion, another movable body, and a location designated by a user of the device; and
      a controller configured to display, in an information display area of the information display device, information about a location of the movable body and information about an area surrounding the location of the movable body,
      wherein, in response to determining that the location of the at least one display target is outside of the information display area, the controller displays the at least one display target in an outer circumferential area of the information display area, and
      wherein the at least one display target is displayed in the outer circumferential area of the information display area so as to be superimposed on a radar image.

14. The radar apparatus of claim 13, wherein the controller extracts the at least one display target to be displayed in the outer circumferential area of the information display area based on a predetermined display condition.

15. The radar apparatus of claim 13, wherein in response to determining that the location of the at least one display target is inside of the information display area, the controller displays the at least one display target in the information display area.

16. A method of displaying information, comprising:
   acquiring information about a location of at least one display target with respect to a movable body, the at least one display target including at least one of a landmark serving as a reference mark used when the movable body is in motion, another movable body, and a location designated by an operator of the movable body; and
   displaying, in an information display area of an information display device, information about a location of the movable body and information about an area surrounding the location of the movable body, wherein, in response to determining that the location of the at least one display target is outside of the information display area, displaying the at least one display target in an outer circumferential area of the information display area.

17. The method of claim 16, wherein the at least one display target being displayed in the outer circumferential area of the information display area is extracted based on a predetermined display condition.

18. The method of claim 16, wherein in response to determining that the location of the at least one display target is inside of the information display area, the controller displays the at least one display target in the information display area.

* * * * *